June 19, 1934.  E. G. WESSMAN  1,963,316
CAPPING MACHINE
Original Filed Sept. 20, 1926   7 Sheets-Sheet 1

Fig. 1.

Inventor
*Edwin G. Wessman*,
By *Milans & Milans*
Attorneys

Fig. 2.

June 19, 1934.  E. G. WESSMAN  1,963,316
CAPPING MACHINE
Original Filed Sept. 20, 1926   7 Sheets-Sheet 3

Fig. 3.

Inventor
Edwin G. Wessman,
By Milans & Milans
Attorneys

June 19, 1934.  E. G. WESSMAN  1,963,316
CAPPING MACHINE
Original Filed Sept. 20, 1926  7 Sheets-Sheet 6

Fig.6.

Inventor
Edwin G. Wessman,

By Milans & Milans
Attorneys

Patented June 19, 1934

1,963,316

UNITED STATES PATENT OFFICE 1,963,316

CAPPING MACHINE

Edwin G. Wessman, Easton, Pa., assignor to Individual Drinking Cup Company, Inc., Easton, Pa., a corporation of Pennsylvania Original application September 20, 1926, Serial No. 136,682. Divided and this application February 10, 1932, Serial No. 592,118

4 Claims. (Cl. 226—92)

My invention relates to new and useful improvements in a machine for capping receptacles, and more particularly to a machine for capping paper or similar receptacles filled with ice cream or similar material, the present application being a division of my application filed September 20, 1926, Serial No. 136,682 and in so far as there is common subject matter in both cases the present application is a continuation of my application filed June 5, 1926, Serial No. 114,008.

The principal object of the invention resides in the provision of a machine of the character described adapted for continuous operation and in which the delivery of the receptacles, the filling of the receptacles, and the capping of the receptacles, is done successively.

Another object of the present invention consists in the provision of novel means for receiving a closure cap discharged from a stack of caps within a holding machine and holding said single cap in position relative to the receptacle to be capped until such time as a capping plunger is operated to forcibly release the cap and to position the same in the open end of the receptacle, the means for holding the single cap also acting to engage the receptacle and properly center the same for the reception of the cap.

A still further object of the present invention resides in the provision of novel means for delivering and positioning receptacles relative to capping mechanism, the capping mechanism including means for supporting a cap ejected from a stack, means for centering the receptacle to properly receive the cap, and means for ejecting the cap from its supporting means and for positioning the same within the open end of the receptacle.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention as they now appear to me, it will be understood that such changes may be made as will fall within the scope of the appended claims.

In recent years paper receptacles, such as paper drinking cups, have come into extensive use and more recently it has been found that they may be used for packaging various materials such as ice cream or the like. It can readily be appreciated that in the use of such receptacles it is desirable that means be provided whereby they may be quickly filled with the desired material and closure caps applied thereto. I have provided a machine adapted more particularly for filling small paper cups or receptacles with ice cream, the cups being dispensed for delivery beneath the filling mechanism and after being filled are automatically capped or closed and delivered in position for removal to any desired place of display or storage.

In the drawings 1 indicates the table supported by the legs 2. Supported on the table 1 is the electric motor 3 which drives the pinion 4 meshing with the gear 5 secured to one end of the horizontal shaft 6, the opposite end of the horizontal shaft having the beveled gear 7 secured thereto. The electric motor 3 is controlled from the switch 8 within easy reach of the operator. The beveled gear 7 meshes with the beveled gear 9 carried by the vertical shaft 10. The upper end of the shaft 10 extends through the top of the table 1, and has secured thereto, above the top of the table, the disc 11 carrying the guide 12 in which is slidably mounted a block having the vertically extending pin 13 to which one end of a link 14 is pivotally connected. The block carrying the pin 13 is adjustable within the guide 12 by means of the adjusting screw 15. The opposite end of the link 14 is pivotally connected at 16 to the slide 17 carrying the plungers 18 for a purpose to be later described.

Pivotally connected to the top of the table at 19 is the arm 20 carrying the roller 21 adapted to operate in an eccentric groove 22 provided in the under surface of the disc 11. Pivotally connected to the outer end of the arm 20 is the rod 23 for a purpose to be later described.

Supported upon the table 1 is the container 24 for ice cream or similar material, the material being discharged from the container through means of a rotatable valve shown at 25. The valve 25 is operated through means of the rod 23, one end of the rod being connected to the valve at 26. The plungers 18, carried by the slide 17, are adapted for discharging the ice cream or material from the valve 25 into the receiving receptacles in a manner as will be presently described. A cover, for the container 24, is shown at 27. Connected to the vertical shaft 10, beneath the beveled gear 9, are the eccentrics 28 and 29. Surrounding the eccentric 28 is a band or ring 30 to which is connected at one end a rod 31, the opposite end of the rod 31 being connected to the arm 32 mounted for oscillating movement and carrying the pawl 33 which is normally held in engagement with the toothed plate 34 by means of the spring 35. The toothed plate 34 is connected to a vertical shaft 36 to the upper end of which is connected the rotatable table 37 which is provided with the recesses 38, adjacent the marginal edge thereof, notches 39 being formed in the marginal edge of the plate or disc and communicating with the recesses 38. As the shaft 10 is rotated the rotatable table 37 will be rotated intermittently for a purpose to be later described.

Surrounding the eccentric 29 is the band or ring 40 to which is pivotally connected one end of the rod 41, the opposite end of the rod being connected to the depending arm 42 carried by the horizontal shaft 43. Also carried by the horizontal shaft 43 is the arm or projection 44 to which is connected the lower end of a vertically extending rod 45, the upper end of the rod 45 being pivotally connected at 46 to the outer end of the arm 47, the inner end of the arm 47 being connected to the shaft 48 to which is connected an agitator or stirrer, not shown, positioned within the container 24. As this stirrer or agitator forms no part of the present invention illustration or detailed description thereof is not thought necessary.

The beveled gear 9 is constantly rotated, as can readily be appreciated, by the electric motor 3 and is adapted to be connected to or disconnected from the shaft 10 through means of a suitable clutch mechanism shown generally at 49 operated through means of the rod 50 extending to the forward end of the machine. This clutch mechanism forms no part of the present invention and a detailed description or illustration thereof is not thought necessary.

For a further understanding of the operation of the machine so far described and more particularly with respect to the clutch mechanism attention is directed to the Mojonnier et al. Patents No. 1,502,314 of July 22, 1924 and 1,529,903 of March 17, 1925.

Figure 2:
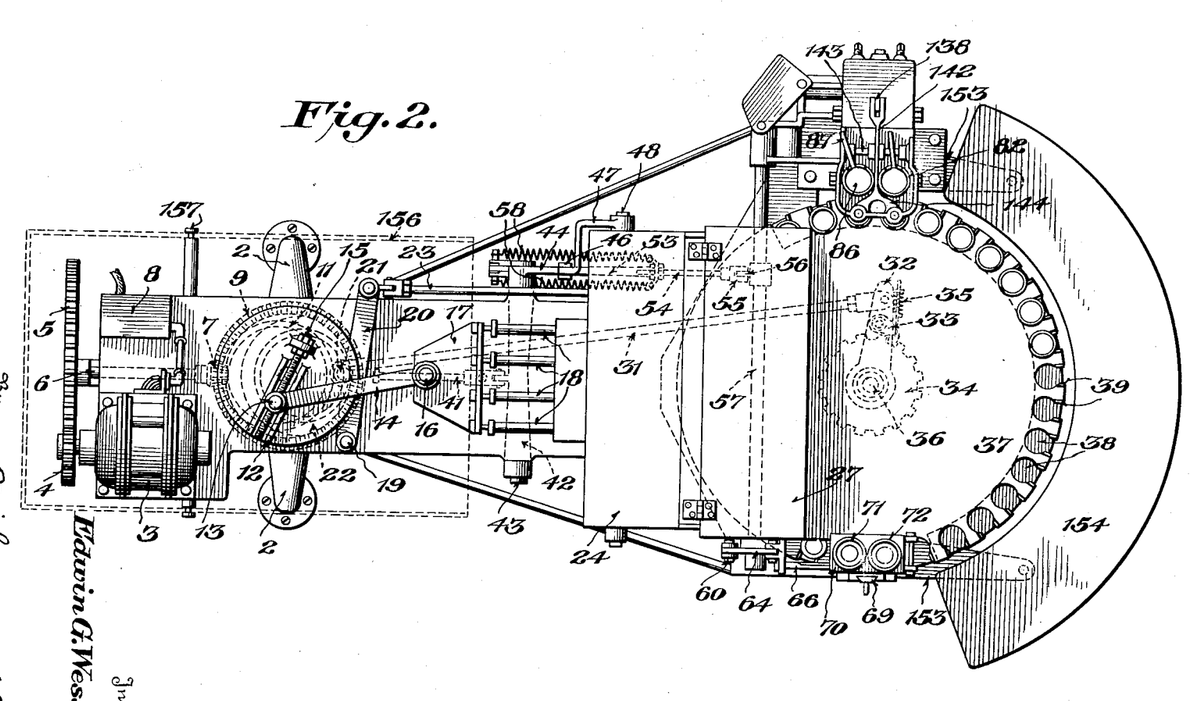
Fig. 2 is a top plan.

Carried by and depending from the horizontal shaft 43 is the arm 51 to the lower end of which is pivotally connected at 52 the sleeve 53 within which telescopes the rod 54 which is pivotally connected at 55 to the arm 56 connected to and depending from the horizontal shaft 57 intermediate the ends thereof as shown more particularly in Fig. 2 of the drawings. The rod 54 and sleeve 53 are yieldably connected by the coiled springs 58 so as to form a yieldable connection between the said rod 54 and sleeve 53 and to allow for movement of one relative to the other should any part of the machine become clogged and inoperative. For a further detailed understanding of the association of the rod 54 and sleeve 53 reference is made to my co-pending application Serial No. 136,682 of which the present application is a division.

Figure 1:
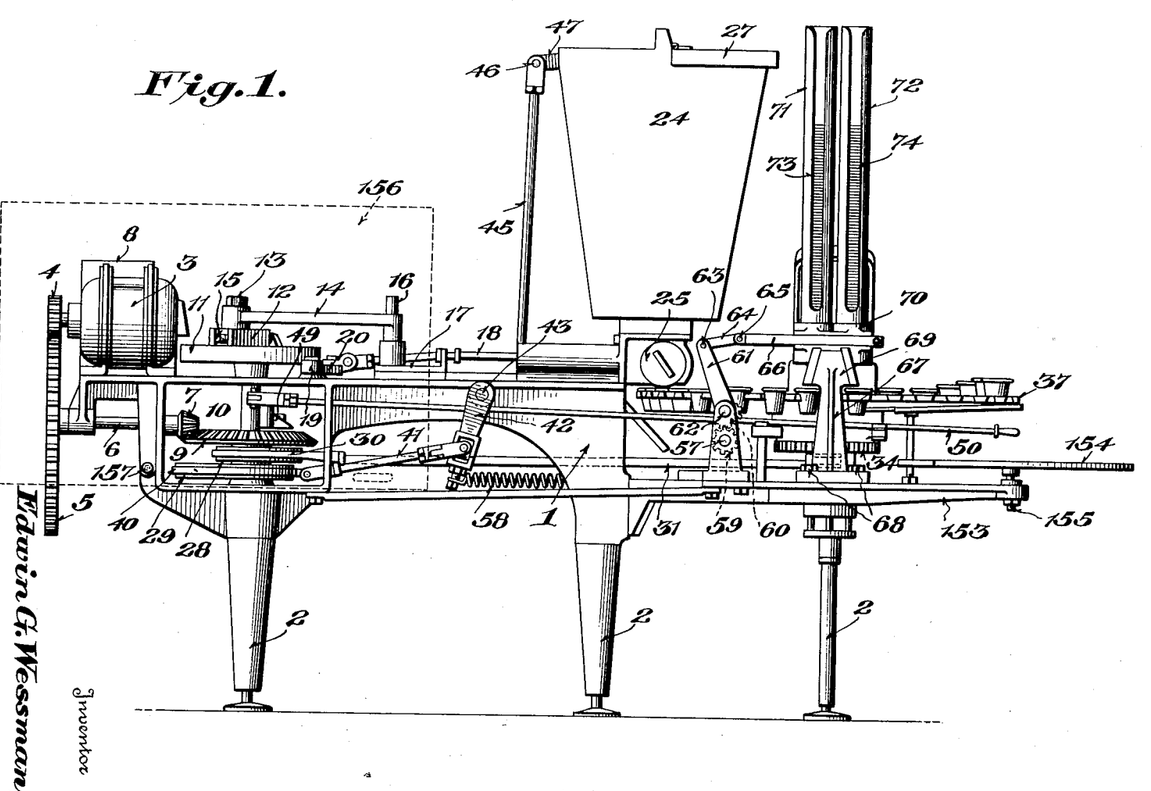
Fig. 1 is a side elevation.

Secured to the horizontal shaft 57, adjacent one end thereof, as shown more particularly in Fig. 1 of the drawings, is a gear wheel 59 which meshes with the teeth 60 formed on the arcuate lower end of the arm 61 which is mounted on the horizontal shaft 62. Pivotally mounted at 63, adjacent the upper end of the arm 61, is a link 64 which is pivotally connected at 65 to the slide or frame 66. Extending upwardly from the top of the table 1 is the standard 67 which is secured to the table by means of the bolts or other suitable fastenings 68. The upper end of the standard 67 is wedge-shaped as shown at 69 and supports the casting 70 having vertically extending openings in which are supported the tubes or magazines 71 and 72 for supporting the stacks 73 and 74 of nested paper receptacles. For a further detailed construction of the slide 66 and the manner in which the receptacles are supported in the tubes or magazines 71 and 72 reference is made to my co-pending application of which the present application is a division. When the slide 66 is operated the cups or receptacles drop into the openings or recesses 38 in the plate 37 and are supported by the upper flanged ends thereof overlying the edges of the recesses. As shown the cups or receptacles are of greater diameter at the top than at the bottom. The openings or recesses 38 are of a diameter equal to the upper diameter of the receptacle below the flanged ends and the notches 39 are of a width equal to the diameter of the lower ends of the receptacles for a purpose which will be later described.

Figure 4:
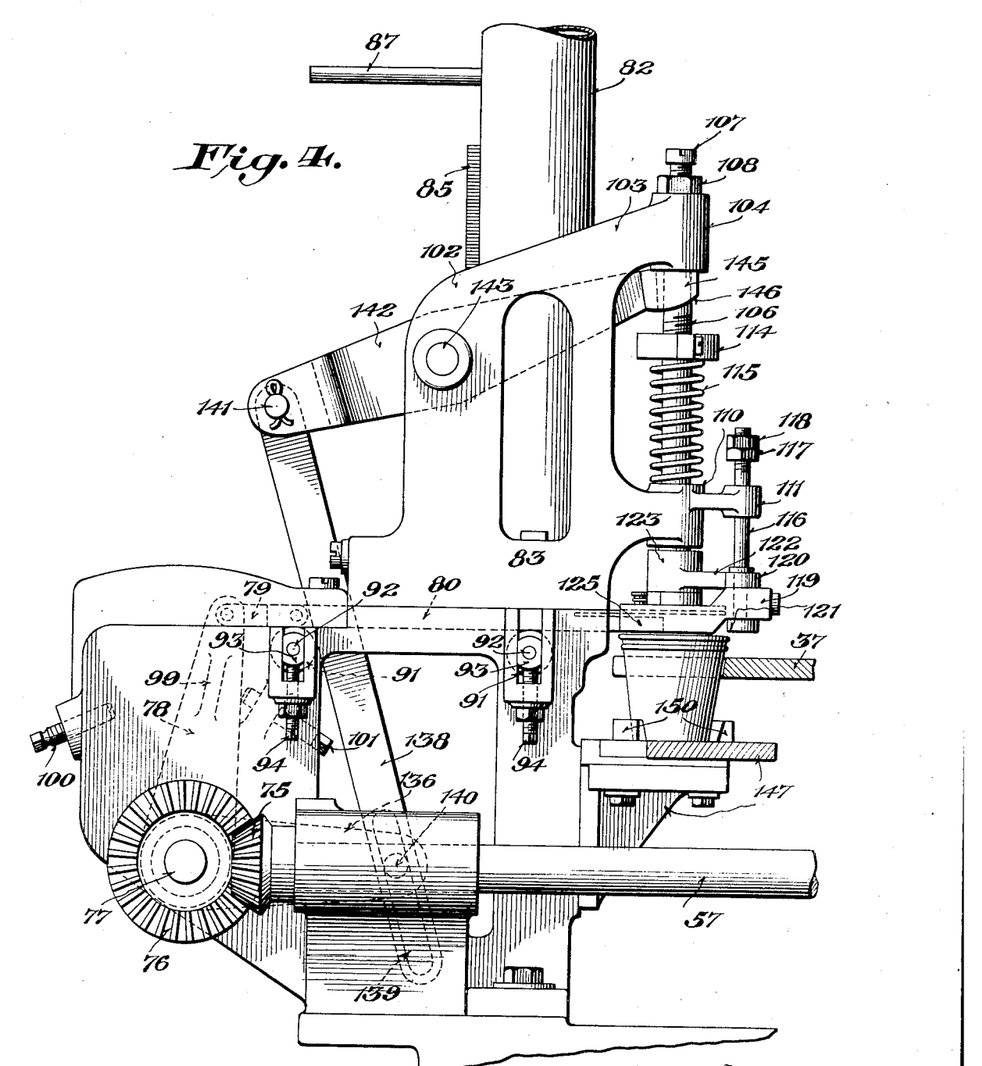
Fig. 4 is a section on the line 4—4 of Fig. 3 looking in the direction of the arrows.

Secured to that end of the shaft 57 opposite to the end to which the gear 59 is secured is the beveled gear 75 which meshes with the beveled gear 76 secured to the horizontal shaft 77. Secured to the shaft 77 and extending upwardly therefrom is a pair of arms 78 adjacent the upper ends of which are pivotally connected one end of the links 79, the opposite ends of the links being pivotally connected to the rear end of the slide or ejector 80, there being a pair of these slides or ejectors for ejecting the closure caps 81 arranged in the tubes or magazines 82, the lower ends of the tubes or magazines being received in openings formed in the casting 83, as shown more particularly in Fig. 5 of the drawings. The slides or ejectors 80 are of the detailed construction illustrated and described in my co-pending application Serial No. 136,682 of which the present application is a division and as the slides or ejectors form no basis for claims in the present application a further detailed description is not thought necessary at the present time. Each of the slides or ejectors 80 normally is positioned as shown more particularly in Fig. 4 of the drawings beneath the stack of closure caps 81. Each of the tubes or magazines 82 is provided with a vertically extending tapered slot 84 through which the ears or projections 85 formed on the caps 81 will project as shown more particularly in Fig. 5 of the drawings. As the slot is tapered to be of less width at the lower end than at the upper end the tabs or projections 85 will be aligned as they reach the lower end of the tube or magazine to be properly positioned for ejection by the slide or ejector 80. A weight 86 is received in each of the tubes or magazines, on top of the stacks of closure caps and extending outwardly from each of the weights is a handle 87. The handles will project through the slots 84 formed in the tubes or magazines which are arranged in pairs as shown.

Secured beneath each of the tubes or magazines 82, and the forward edge of the casting 83 is a pair of plates 88 each of which has an upwardly extending longitudinal rib or flange 89 from the forward end of which extends the lip or projection 90 for a purpose to be later described. The upper surfaces of the ribs or flanges are sufficiently spaced below the lower ends of the tubes and the lower surface of the casting 83 to allow a single closure cap to pass therebetween.

The slides or ejectors 80 are mounted upon the rollers 91 carried by the shafts 92 the ends of which are carried in the bearings 93 adjustable by the screws 94. The casting 83 is formed with a pair of recesses 95 extending from the lower surface thereof and in these recesses are mounted the carriages 96 which support the rollers 97 which engage the upper surfaces of the slides or ejectors as shown more particularly in Fig. 5 of the drawings. The carriages 96 are normally held in their lowermost positions, with the rollers in contact with the slides or ejectors by means of the coiled springs 98.

Figure 5:
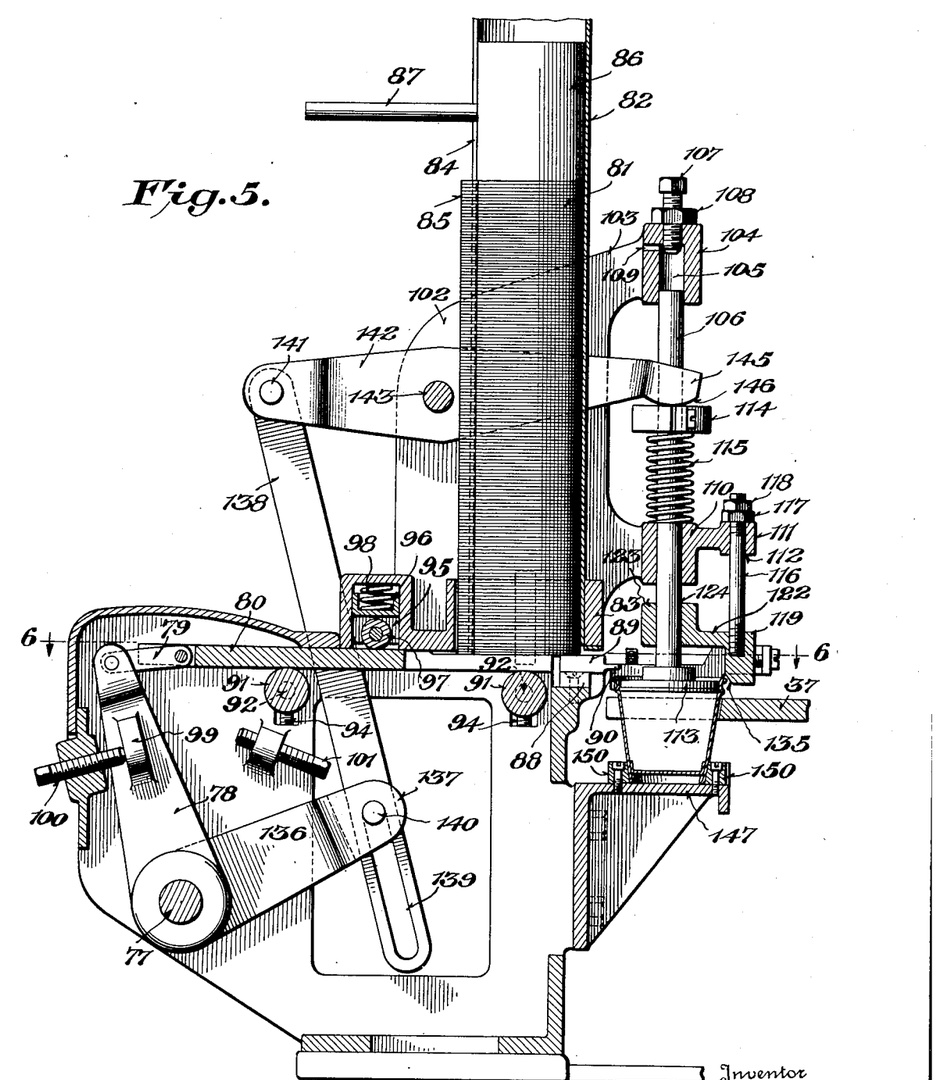
Fig. 5 is a section on the line 5—5 of Fig. 3.

Each of the arms 78 is provided with an outwardly extending ear 99 to be engaged by an adjustable screw 100 as shown more particularly in Fig. 5 of the drawings, these adjustable screws, contacting with the ears, limit the rearward movement of the arms. The forward movement of the arms are limited by the adjustable screws 101 which will engage the edges of the ears as shown more particularly in Fig. 4 of the drawings.

The casting 83, which receives the lower ends of the tubes or magazines 82 is provided with the upwardly extending side portions 102 which have the forwardly extending arms 103 connected by the cross piece 104. The cross piece 104 is provided with a pair of transversely spaced recesses 105 which form guides for the reception of the upper ends of the plunger rods 106, as shown more particularly in Fig. 5 of the drawings. A screw 107 extends into the upper end of each of the recesses 105 and is adapted for limiting the upward movement of the plunger rods. Lock nuts are shown at 108. Openings 109 communicate with the recesses 105 to relieve air pressure in the recesses as the plunger rods are raised. The plunger rods 106 also pass through the guides 110 extending forwardly from the guide portions 102 and each of the guide portions is provided with a forwardly extending arm 111 having the vertically extending opening 112 for a purpose to be later described. Secured to the lower end of each of the plunger rods 106 is a plunger head 113 of a diameter to be received within the open end of the cup or receptacle to be capped. Secured to each of the plunger rods 106 is an adjustable split collar 114 and surrounding each of the rods, between the lower surface of the collar 114 and the upper surface of the guide portion 110 is a coiled spring 115, the coiled springs normally holding the plunger rods in their raised positions.

Figure 6:
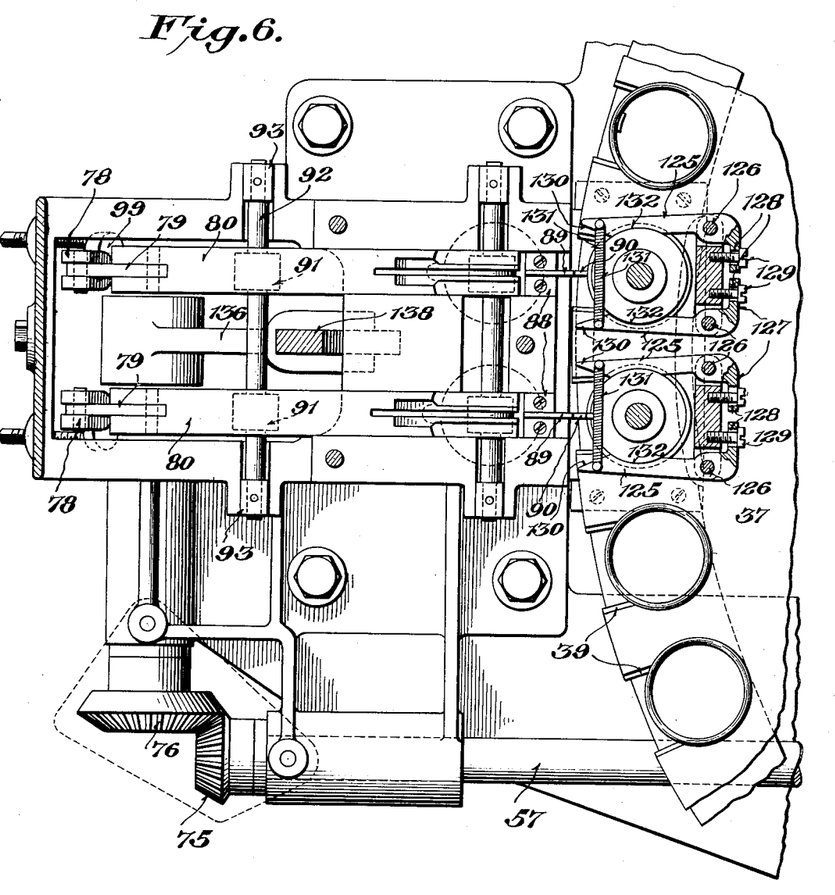
Fig. 6 is a horizontal section on the line 6—6 of Fig. 5 looking in the direction of the arrows.
Figure 7:
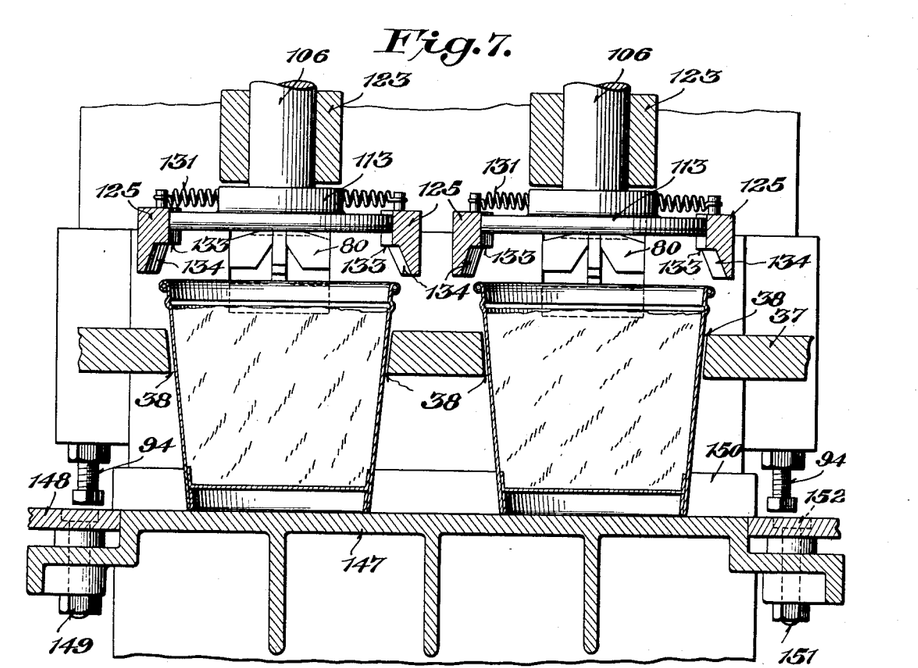
Fig. 7 is a fragmental transverse vertical section, with parts shown in elevation, showing the spring controlled arms for holding a closure cap and the inserting plunger in raised position with the receptacle positioned therebeneath.
Figure 8:
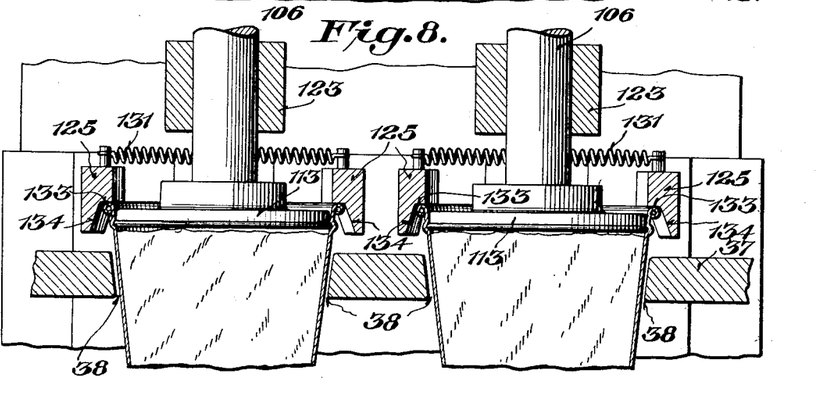
Fig. 8 is a view similar to Fig. 7 showing the cap holding means and the inserting plunger in their lowered or capping position.

Extending through the opening 112 in the arm 111 is the rod 116, the upper end of the rod being threaded to receive the nut 117 and the lock nut 118. The rod 116 is freely slidable through the opening in the arm and the lower end of the rod carries the casting 119, the ends of which are forked to form the upper ear 120 and the lower ear 121 for a purpose which will be later described. Extending inwardly from the casting 119 is the arm 122 having the enlargement 123 formed thereon and provided with the vertically extending opening 124 through which the plunger rod 106 passes. Pivotally connected to each end of the casting 119, between the upper and lower ears 120 and 121, respectively thereof, is an arm 125 the pivot point being shown at 126. The outer end of each of the arms is formed with the right angle extension 127 having an opening 128 therein through which passes an adjusting screw 129. The inner or free end of each of the arms is beveled as shown at 130 and the free ends of the arms are drawn one towards the other by means of the coiled spring 131. Each of the arms, intermediate its ends, is formed with an arcuate shaped recess 132 and the inner edge of the arms, adjacent said arcuate-shaped recess is cut away at the bottom to form the shoulder 133 and the inclined surface 134 as shown more particularly in Figs. 7 and 8 of the drawings. The inner face of the casting 119, at the bottom edge thereof, is beveled as shown at 135. The inner movement of the free ends of the arms 132, by the coiled spring 131, is limited by the head of the adjusting screw 129 as can be readily seen by reference to Fig. 6 of the drawings. When the plunger rod 106 is in the raised position the head 113 will hold the arm 122 with its associated pivoted arms in the raised position shown in Fig. 4 of the drawings and when the plunger rod and its associated head is lowered, in a manner to be later described, the arm 122 will drop with said plunger head until the nut 117 engages the arm 111 and when this takes place the arm 122 with its associated parts will be held in the position shown in Fig. 6 but the plunger rod and head may continue its downward movement into the open end of the receptacle.

Secured to the horizontally extending shaft 77 is an inwardly extending arm 136, the outer end of which is formed as shown at 137 to receive the bar 138 having the elongated opening 139 formed therein. A transversely extending pin 140 is carried by the forked end of the arm 136 and operates in the elongated opening 139 of the bar 138. The upper end of the bar is pivotally connected at 141 to the end of the lever 142 which is carried by the transversely extending shaft 143 supported by the sides 102 extending upwardly from the casting 83. The lever 142 extends between the pair of tubes or magazines 82, as shown more particularly in Fig. 2 of the drawings, and as also shown in this particular figure the outer end of the lever is forked or bifurcated to form the arms 144 each of which is forked as shown at 145 and straddles one of the plunger rods 106. The lower faces of the forked projections 145 are rounded as shown at 146 and are adapted to engage the upper surfaces of the collars 114 when the plunger rods and plungers are adapted to be operated.

Figure 3:
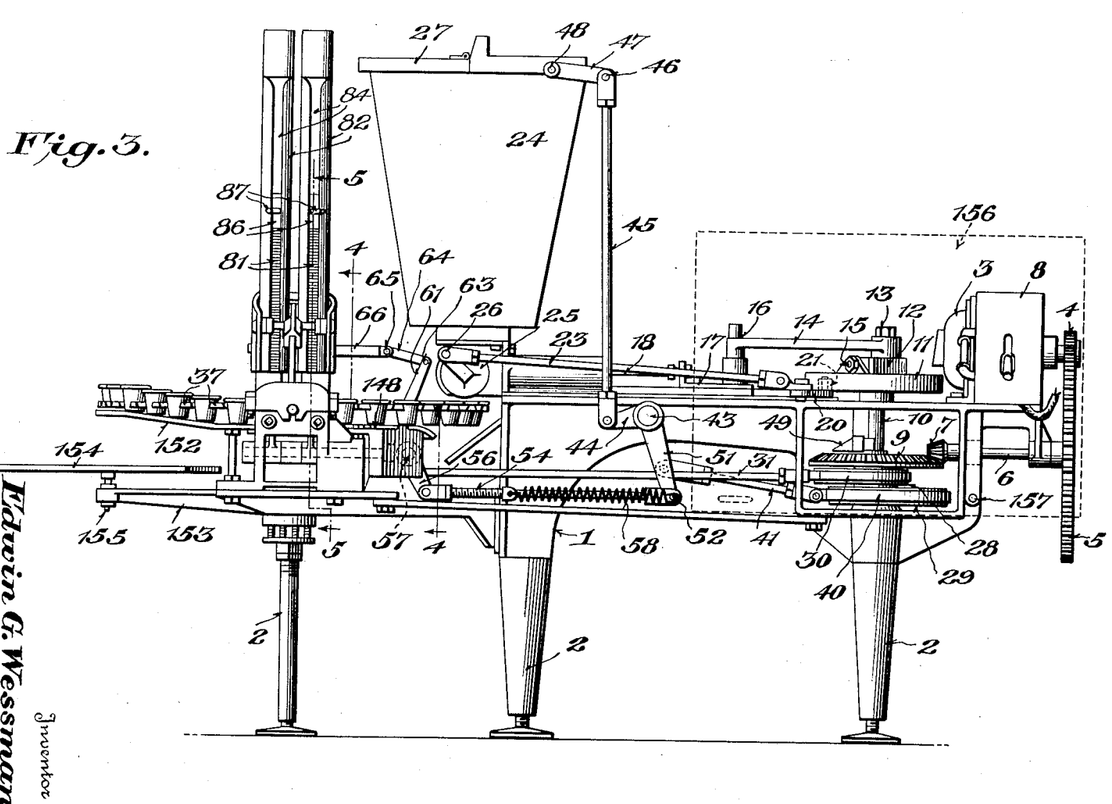
Fig. 3 is a side elevation looking in a direction opposite to that disclosed in Fig. 1.

When the cups or receptacles are initially dropped into the recesses or openings 38 they are supported by the flanged ends thereof engaging around the edge of said openings or recesses. However, it can be appreciated that during the capping operation or the operation of inserting the closure cap into the open end of the receptacle that it will be desirable to more securely support the receptacle. For this purpose I have secured at a point beneath the capping plungers 113 the stationary table or plate 147, said plate or table being of such a height, relative to the rotatable table 37 as to raise the upper ends of the cups or receptacles above the upper surface of the rotatable table as shown more particularly in Fig. 7 of the drawings. For raising or guiding the cups or receptacles onto the stationary table 147 I provide the inclined plate or strip 148 which is shown more particularly in Fig. 3 of the drawings. This strip or plate 148 is secured to the end of the stationary table 147 by means of the nuts and bolts 149, the end of the stationary table or plate 147 being slightly offset so that the upper surface of the adjacent end of the plate or strip 148 may be flushed with the upper surface of the plate or table 147. For guiding the lower ends of the cups or receptacles over the stationary table 147 I provide the longitudinally extending strips 150 between which the lower ends of the receptacles or cups pass as shown more particularly in Fig. 5 of the drawings. Secured to the opposite end of the table or plate 147, by means of the nuts or bolts 151, is the plate or strip 152 which is inclined upwardly as shown in Fig. 3. This inclined plate or strip 152 continues to gradually raise the cups or receptacles after they have left the capping mechanism so that at the point where the cups or receptacles are to be removed the lower or smaller ends of the cups or receptacles align with the reduced notches 39, leading to the openings or recesses 38 and the cups or receptacles may be removed by sliding movement, the lower or smaller ends of the cups or receptacles passing through the reduced portions 39.

The cups or receptacles may be removed from the rotatable table either by hand or automatically.

Extending forwardly from the end of the machine are the arms 153 which support the arcuate-shaped table 154. The table is adjustable through means of the screws 155 carried by the arms 153, as shown more particularly in Figs. 1 and 3 of the drawings. This table 154 may be used for various purposes such as supporting the filled cups when removed from the rotatable table by hand. At 156 I have shown in dotted lines a cover for the driving mechanism at one end of the machine, this cover being pivotally connected at 157 so that it may be swung, when desired, to gain access to the driving mechanism.

Having described the detailed construction of my machine I will now give a further description of the operation. The machine is started by manipulation of the switch 8 which starts the electric motor 3. The pinion or gear 4, meshing with the gear 5 rotates the shaft 6 and this in turn through means of the beveled gear 7 rotates the beveled gear 9 which when the clutch mechanism 49 is connected rotates the shaft 10, the disc 11, and eccentrics 28 and 29. The table 37 is rotated periodically by the pawl 33 engaging the toothed wheel 34, the arm 32 carrying the pawl 33 being operated by the rod 31 which in turn is operated through means of the eccentric 28. Each movement or rotation of the table 37 is the distance of two of the recesses or openings 38, it being understood that two cups or receptacles are dropped into the rotatable table, at a time, that two cups will be filled at a time, and that two cups will be capped at the same time. Of course, I do not wish to limit myself to this particular arrangement for it will be understood that, if desired, the operation might be only on one cup or on more than two cups. With the table 37 stationary it is in position to receive the cups or receptacles. The cup dropping mechanism is operated through means of the eccentric 28 which operates the rod 41, the arm 42, the shaft 43 in turn through means of the flexible connection operating the arm 55 which in turn oscillates the shaft 57. Secured to the shaft 57 is the gear 59 and as the shaft oscillates the gear 59 meshing with the teeth 60 swings the arm 61 and this arm in turn operates the slide or frame 66 to dispense the cups in the manner previously described. When two cups have been dropped into the recesses of the table the rotation of the table in the manner previously described carries them to a position to be filled with ice cream or the like from the container or receptacle 24. The ice cream or similar material is discharged into the cups or receptacles through the valve 25 which is operated by the eccentric groove 22 which operates the pivoted arm 20 which in turn is connected to the rod 23 which operates the valve. The ice cream is discharged through the valve by means of the plungers 18 which are connected to the plate 17 operated by the link 14 connected to the disc 11. After the receptacles have been filled with the ice cream or other material they are carried to a position to be capped. As has been previously described when reaching the capping position the cups or receptacles are raised and guided into the stationary table 147. When at the capping position the rotation of the shaft 62, in the manner previously described, through means of the beveled gears 75 and 76 oscillates the horizontal shaft 77. Initially the shaft 77 is rotated rearwardly so that a cap 81, carried in the tube or container 82, may be received upon the slide or ejector 80. The cap will be positioned upon the forward end of the slide or ejector. With the cap thus positioned upon the slide or ejector the parts are in the position shown more particularly in Fig. 5 of the drawings. With the cap in position the slide or ejector is moved to the right of the position shown in Fig. 5 and carries with it the cap. The ejector will carry the cap into position between the spring arms 125, the movement of the cap engaging the beveled surfaces 130 of the spring arms, opening them against the action of the coiled spring 131 so that the cap may be positioned between the arms and held thereby. With the caps thus held the oscillation of the shaft 77 again in that direction to draw the slide or ejector 80 into position for the reception of another cap will raise the arm 136. This movement will engage the pin 140 with the upper end of the elongated opening 139 and raise the bar 138. The raising of the bar 138 swings the lever 142 on its pivot point 143 to lower the outer end of the lever and the lowering of the outer end of the lever causes the rounded or arcuate surface 146 thereof to engage the collar 114 and lower the plunger rod 106 and plunger head 113, against the action of the coiled spring 115. As the plunger head 113 is lowered it also allows the arm 122 carrying the pivoted arms 125 to be lowered until the nut 117 engages the upper surface of the arm 110. This limits the downward movement of the arm 122 with the pivoted arms 125. The lowering of the pivoted arms 125 causes the inclined surfaces 134 thereof to engage the upper edge of the cup or receptacle and thereby center the same in alignment with the cap carried by the pivoted arms. While the downward movement of the pivoted arms is limited by engagement of the nut 117 with the arm 110 the downward movement of the plunger rod and plunger head may be continued. This continued downward movement of the plunger head disengages the closure cap from the spring controlled pivoted arms and allows the same to be forced into the open end of the cup or receptacle as shown more particularly in Fig. 8. When the cap is being held by the spring controlled pivoted arms the lip or projection 85 of the cap overlies the lip or projection 90 formed on the upwardly extending ledge or flange 89 of the plate 88. As the cap is released from the spring controlled pivoted arms and is lowered by the plunger the lip or projection 85 on the cap engaging the lip or projection 90 is bent upwardly prior to the insertion of the cap in the open end of the receptacle. When the cap has been positioned within the receptacle the parts return to their original position and the raising of the plunger head 113 will raise the arm 122 and carry with it the pivoted arms. It will be understood that the pivoted arms not only act for receiving the closure cap from the ejector but hold the same until forced therefrom by the plunger. These pivoted arms also act for properly centering the cups or receptacles relative to the caps so that they will always be in position to receive the same. When the capping plungers are being lowered for positioning the caps in the cups or receptacles the slide or ejector 80 is being positioned for receiving a cap from the tube or magazine. Then when the cap is being ejected to position between the spring controlled pivoted arms the capping plunger is raised.

Having fully described my invention what I claim as new and desire to secure by Letters Patent is:

1. In a machine of the character described the combination with a plunger operable for placing a cap into the open mouth of a container, of a member carried by and operable with the plunger for initially receiving the cap, said member including arms between which the cap is supported, and yieldable means for holding the arms in engagement with the edge of the cap, the arms being engaged with the edge of the container for positioning the container relative to the plunger and in such engagement permitting the cap to be released and positioned in the open mouth of the container by a continued movement of the plunger.

2. In a machine of the character described, the combination with a plunger operable for placing a cap into the open mouth of a container, of a member carried by, slidable relative to and operable with the plunger for a portion of its cap placing movement, said member including arms between which the cap is initially received and supported, and yieldable means for holding the arms in engagement with the edge of the cap, the arms being engaged with the edge of the container for positioning the container relative to the plunger and in such engagement permitting the cap to be released and positioned in the open mouth of the container by a continued movement of the plunger.

3. In a machine of the character described, the combination with a plunger operable for placing a cap into the open mouth of a container, of a member carried by and operable with the plunger for initially receiving the cap, said member including arms between which the cap is supported, and yieldable means for holding the arms in engagement with the edge of the cap, each of the arms including an arcuate-shaped vertically straight wall surface to be engaged with the edge of the cap and an inclined surface therebeneath adapted to be engaged with the edge of the container for positioning the container relative to the plunger and in such engagement permitting the cap to be released and positioned in the open mouth of the container by a continued movement of the plunger.

4. In a machine of the character described the combination with a plunger operable for placing a cap into the open mouth of a container, of a member carried by and operable with the plunger for initially receiving the cap, said member including arms between which the cap is supported, each of the arms including a surface engageable with the edge of the cap, an inclined surface adapted to be engaged with the edge of the container for positioning the container relative to the plunger, and a shoulder adapted for limiting the downward movement of the member by engagement with the upper edge of the container, the cap being released and positioned in the open mouth of the container by a continued movement of the plunger.

EDWIN G. WESSMAN.